United States Patent [19]
Teranishi et al.

[11] Patent Number: 6,033,738
[45] Date of Patent: Mar. 7, 2000

[54] METHOD FOR PRODUCING WATER-REPELLENT ARTICLES, WATER-REPELLENT ARTICLES OBTAINED THEREBY, AND SOLUTION FOR FORMING WATER-REPELLENT FILM

[75] Inventors: Toyoyuki Teranishi; Kazutaka Kamitani; Takashi Sunada, all of Osaka, Japan

[73] Assignee: Nippon Sheet Glass Co., Ltd., Osaka, Japan

[21] Appl. No.: 09/103,543

[22] Filed: Jun. 24, 1998

[30] Foreign Application Priority Data

Jun. 24, 1997 [JP] Japan .................................. 9-166456
Jun. 1, 1998 [JP] Japan .................................. 10-150847

[51] Int. Cl.$^7$ ........................................................ B05D 3/02
[52] U.S. Cl. ......................... 427/387; 428/447; 524/765; 524/767
[58] Field of Search .................................. 524/765, 767; 427/387; 428/447

[56] References Cited

FOREIGN PATENT DOCUMENTS

| 0513727 | 11/1992 | European Pat. Off. . |
|---|---|---|
| 0548775 | 6/1993 | European Pat. Off. . |
| 0719743 | 7/1996 | European Pat. Off. . |
| 0776925 | 6/1997 | European Pat. Off. . |
| 0811430 | 12/1997 | European Pat. Off. . |
| 4-338137 | 11/1992 | Japan . |

*Primary Examiner*—Melvyn I. Marquis
*Attorney, Agent, or Firm*—Sughrue, Mion, Zinn, Macpeak & Seas, PLLC

[57] ABSTRACT

Water-repellent articles having an excellent water repellency, particularly water-repellent articles having a great contact angle with respect to waterdrop, an excellent waterdrop rollability, a high scuff resistance and a high weathering resistance, a method for producing the water-repellent articles, and a solution for forming a water-repellent film are dsiclosed. A novel method for producing water-repellent articles is provided, which comprises dissolving a chlorosilyl group-containing compound and a fluoroalkyl group-containing silane compound in a solvent containing an alcohol and/or water content to obtain a solution having the chloro group in said chlorosilyl group-containing compound substituted by an alkoxyl group or hydroxyl group, applying said solution to the surface of a substrate, and then drying the coated material to form a water-repellent film.

68 Claims, No Drawings

METHOD FOR PRODUCING WATER-REPELLENT ARTICLES, WATER-REPELLENT ARTICLES OBTAINED THEREBY, AND SOLUTION FOR FORMING WATER-REPELLENT FILM

FIELD OF THE INVENTION

The present invention relates to a method for producing water-repellent articles by forming a water-repellent film on the surface of a substrate of, for example, glass, ceramics, plastics, metal or the like, water-repellent articles obtained by the method, and a solution for forming the water-repellent film.

BACKGROUND OF THE INVENTION

In forming a water-repellent film on the surface of a substrate such as glass or the like, the technique is known to form an undercoat of silicon oxide or the like between the substrate and the water-repellent layer in order to improve the bonding strength of the substrate with the water-repellent film and prevent the diffusion of an alkali component where the substrate contains the alkali component, thereby enhancing the durability of the water-repellent film.

As techniques for forming a water-repellent film having such an undercoat there have been known two techniques, i.e., technique which comprises forming an undercoat of silicon oxide or the like on a substrate, and then forming a water-repellent film on the undercoat to produce a two-layer structure and technique which comprises applying a mixture of an undercoat composition and a water-repellent component to a substrate, thereby forming a single layer comprising of an undercoat layer and a water-repellent layer. The latter technique requires less producing steps and thus exhibits better productivity than the former. Examples of the latter technique include those disclosed in JP-B-63-24554 (The term "JP-B" as used herein means an "examined Japanese patent publication"), JP-A-61-215235 (The term "JP-A" as used herein means an "unexamined Japanese patent application"), JP-A-64-68477, JP-A-64-68477, JP-A-4-338137, and JP-A-8-239653. The feature of these techniques will be described below.

JP-B-63-24554 discloses a water-repellent surface treating agent obtained by modifying a silanol oligomer (eicosamer to tetracontamer) with a fluoroalkylsilane.

JP-A-61-215235 discloses a water-repellent, stain-resistant low reflectance glass obtained by a process which comprises applying to the surface of a substrate a solution obtained by allowing a fluoroalkyl group-containing silane compound and a silane coupling agent to undergo hydrolysis reaction in an alcoholic solvent in the presence of acetic acid and an organic tin compound to produce a co-condensate, and then heat curing the coating.

JP-A-64-68477 discloses a process for the production of a water-repellent steel plate which comprises applying an alcohol solution containing an alkoxide such as silicon oxide and a fluoroalkylsilane to the surface of a steel plate, and then heating the coated material.

JP-A-4-338137 discloses a water-repellent glass obtained by applying a mixture of a silicon alkoxide, a substituted silicon alkoxide obtained by substituting some of alkoxyl groups in silicon alkoxide by fluoroalkyl group, an alcohol, water, and an acid or base to the surface of a glass substrate, and then calcining the coated material.

JP-A-8-239653 discloses a water-repellent article obtained by treating an article with a composition comprising a mixture of a perfluoroalkyl alkylsilane and a completely hydrolyzable silane.

The methods disclosed in the above JP-B-63-24554, JP-A-61-215235 and JP-A-4-338137 comprise allowing a fluoroalkyl group-containing silane and a silicon alkoxide to undergo hydrolysis in an alcohol solution in the presence of a catalyst to produce a polycondensate and a co-condensate.

Since the above methods involve the bonding of polymers, the resulting water-repellent film is liable to have voids, making the denseness thereof low. In order to enhance the denseness of the water-repellent film, a calcining step is required, which results in increase of the production cost.

The method disclosed in the above JP-A-64-68477 is effected in the absence of catalyst and thus exhibits a poor reactivity. The resulting water-repellent film has a reduced denseness. In order to enhance the denseness of the water-repellent film, a calcining step is required, resulting in increase of the production cost.

In the technique disclosed in the above JP-A-8-239653, a coating composition comprising a chlorosilane and a non-aqueous solvent is preferably used. However, non-aqueous solvents are expensive. The coating composition was duplicated. As a result, it was found that since this coating composition reacts with moisture in the air to undergo gelation that renders the composition instable, it is necessary to maintain the ambient humidity at 10%RH or less, and preferably nearly 0%RH. Thus, it is difficult to control the environmental condition under which the coating composition.

This technique was duplicated. As a result, it was found that the resulting water-repellent film has minute unevenness on the surface thereof and thus exhibits a poor scuff resistance.

The techniques were duplicated. As a result, it was found that all the resulting water-repellent articles exhibit a poor water droplet rollability.

SUMMARY OF THE INVENTION

Accordingly, an object of the present invention is to provide water-repellent articles having an excellent water repellency, particularly water-repellent articles having a large contact angle with respect to water droplet, an excellent water droplet rollability, a high scuff resistance and a high weathering resistance.

Another object of the present invention is to provide a method for producing the water-repellent articles.

Further object of the present invention is to provide a solution for forming a water-repellent film.

The present invention also provide a method for producing water-repellent articles and a solution for forming a water-repellent film, which allow easy control over the environmental humidity during storage and coating.

These and other objects of the present invention will become more apparent from the following detailed description and examples.

The foregoing objects of the present invention can be accomplished by the following inventions.

A method for producing water-repellent articles, which comprises dissolving a chlorosilyl group-containing compound and a fluoroalkyl group-containing silane compound in a solvent containing an alcohol and/or water content to obtain a solution having the chloro group in said chlorosilyl group-containing compound substituted by an alkoxyl group or hydroxyl group, applying the solution to the surface of a substrate, and then drying the coated material to form a water-repellent film.

A method for producing water-repellent articles, which comprises applying a solution containing a silicon alkoxide or hydrolyzate thereof in the form of monomer or polymer of not higher than nonadecamer, a fluoroalkyl group-containing silane compound and an acid, applying the solution to a substrate, and then drying the coated material to form a water-repellent film.

The method for producing water-repellent articles as defined above, wherein the solution contains an acid and water content in a concentration satisfying the following relationships, respectively:

$$0.001 \leq S \leq 3; \text{ and}$$

$$0 \leq W \leq 20$$

wherein S represents the concentration of acid (normal); and W represents the concentration of water content (% by weight), and the proportion of the chlorosilyl group-containing compound and the fluoroalkyl group-containing silane compound dissolved in the solution is 100:0.05 to 50 as calculated in terms of Si(Cl):Si(F) wherein Si(Cl) represents the number of silicon atoms in the chlorosilyl group-containing compound and Si(F) represents the number of silicon atoms in the fluoroalkyl group-containing silane compound.

The method for producing water-repellent articles as defined above, wherein the concentration of the acid and the water content satisfy the following relationships, respectively:

$$0.01 \leq S \leq 1; \text{ and}$$

$$0 \leq W \leq 10$$

and the proportion Si(Cl):Si(F) is 100:0.05 to 30.

The method for producing water-repellent articles as defined above, wherein the concentration of the acid and the water content satisfy the following relationships, respectively:

$$0.1 \leq S \leq 1; \text{ and}$$

$$0 \leq W \leq 2$$

and the proportion Si(Cl):Si(F) is 100:0.05 to 3.

The method for producing water-repellent articles as defined above, wherein the solution comprises the chlorosilyl group-containing compound and the fluoroalkyl group-containing silane compound dissolved therein in a total amount of from 0.01 to 10% by weight.

The method for producing water-repellent articles as defined above, wherein the chlorosilyl group-containing compound is tetrachlorosilane.

The method for producing water-repellent articles as defined above, wherein the fluoroalkyl group-containing silane compound is a silane compound containing a fluoroalkyl group and an alkoxyl group, acyloxy group or chlorine atom.

The method for producing water-repellent articles as defined above, wherein the fluoroalkyl group-containing silane compound is 3-heptadecafluorodecyl trimethoxysilane or 3-heptadecafluorodecyltrichlorosilane.

The method for producing water-repellent articles as defined above, wherein the solvent is a hydrophilic solvent.

The method for producing water-repellent articles as defined above, wherein the solvent is an alcoholic solvent.

The method for producing water-repellent articles as defined above, wherein the substrate is one containing a hydrophilic group in the surface thereof.

The method for producing water-repellent articles as defined above, wherein the solution further comprises an acid dissolved therein.

The method for producing water-repellent articles as defined above, wherein the concentration of the acid is not less than 0.3 times the water content of the solution.

The method for producing water-repellent articles as defined above, wherein the acid is hydrochloric acid.

The method for producing water-repellent articles as defined above, wherein the solution has a pH value of from 0 to 3.

The method for producing water-repellent articles as defined above, wherein the water-repellent film has a thickness of from 5 to 200 nm.

A water-repellent article obtained by a method as defined above, characterized in that the surface of the water-repellent film has an arithmetic mean roughness (Ra) of not more than 0.5 nm and a roughness (Rz) of not more than 5 nm on the average over 10 points.

A water-repellent article obtained by a method as defined above, characterized in that the fluorine concentration in the surface of the water-repellent film is not less than 0.8 as calculated in terms of ratio of fluorine atom to silicon atom.

A water-repellent article comprising a substrate and a water-repellent film comprising silicon oxide as a main component and fluoroalkyl group applied to the surface of the substrate by sol-gel method, characterized in that the surface of the water-repellent film has an arithmetic mean roughness (Ra) of not more than 0.5 nm and a roughness (Rz) of not more than 5 nm on the average over 10 points.

A water-repellent article comprising a substrate and a water-repellent film comprising silicon oxide as a main component and fluoroalkyl group applied to the surface of the substrate by sol-gel method, characterized in that the fluorine concentration in the surface of the water-repellent film is not less than 0.8 as calculated in terms of ratio of fluorine atom to silicon atom.

A solution for forming a water-repellent film obtained by dissolving a chlorosilyl group-containing compound and a fluoroalkyl group-containing silane compound in a solvent containing an alcohol and/or water content so that the chloro group in the chlorosilyl group-containing compound is substituted by alkoxyl group or hydroxyl group.

A solution for forming a water-repellent film containing a silicon alkoxide or hydrolyzate thereof in the form of monomer or polymer of not higher than nonadecamer, a fluoroalkyl group-containing silane compound and an acid.

The solution for forming a water-repellent film as defined above, wherein the solution contains an acid and water content in a concentration satisfying the following relationships, respectively:

$$0.001 \leq S \leq 3; \text{ and}$$

$$0 \leq W \leq 20$$

wherein S represents the concentration of acid (normal); and W represents the concentration of water content (% by weight), and the proportion of the chlorosilyl group-containing compound and the fluoroalkyl group-containing silane compound dissolved in the solution is 100:0.05 to 50 as calculated in terms of Si(Cl):Si(F) wherein Si(Cl) represents the number of silicon atoms in the chlorosilyl group-containing compound and Si(F) represents the number of silicon atoms in the fluoroalkyl group-containing silane compound.

The solution for forming a water-repellent film as defined above, wherein the concentration of the acid and the water content satisfy the following relationships, respectively:

$0.01 \leq S \leq 1$; and $0 \leq W \leq 10$ and the proportion Si(Cl):Si(F) is 100:0.05 to 30.

The solution for forming a water-repellent film as defined above, wherein the concentration of the acid and the water content satisfy the following relationships, respectively:

$0.1 \leq S \leq 1$; and $0 \leq W \leq 2$ and the proportion Si(Cl):Si(F) is 100:0.05 to 3.

The solution for forming a water-repellent film as defined above, wherein the solution comprises the chlorosilyl group-containing compound and the fluoroalkyl group-containing silane compound dissolved therein in a total amount of from 0.01 to 10% by weight.

The solution for forming a water-repellent film as defined above, wherein the fluoroalkyl group-containing compound is tetrachlorosilane.

The solution for forming a water-repellent film as defined above, wherein the fluoroalkyl group-containing silane compound is a silane compound containing a fluoroalkyl group and an alkoxyl group, acyloxy group or chlorine atom.

The solution for forming a water-repellent film as defined above, wherein the fluoroalkyl group-containing silane compound is 3-heptadecafluorodecyl trimethoxysilane or 3-heptadecafluorodecyltrichlorosilane.

The solution for forming a water-repellent film as defined above, wherein the solvent is a hydrophilic solvent.

The solution for forming a water-repellent film as defined above, wherein the solvent is an alcoholic solvent.

The solution for forming a water-repellent film as defined above, wherein the solution further comprises an acid dissolved therein.

The solution for forming a water-repellent film as defined above, wherein the concentration of the acid is not less than 0.3 times the water content of the solution.

The solution for forming a water-repellent film as defined above, wherein the acid is hydrochloric acid.

The solution for forming a water-repellent film as defined above, wherein the solution has a pH value of from 0 to 3.

A solution for forming a water-repellent film containing a silicon alkoxide or hydrolyzate thereof in the form of monomer or polymer of not higher than nonadecamer obtained by dissolving a chlorosilyl group-containing compound and a fluoroalkyl group-containing silane compound in a solvent containing an alcohol and/or water content so that the chloro group in the chlorosilyl group-containing compound is substituted by alkoxyl group or hydroxyl group.

DETAILED DESCRIPTION OF THE INVENTION

The compounds, solvents and other components to be used in the present invention will be further described hereinafter.

The chlorosilyl group-containing compound to be used herein is a compound containing at least one chlorosilyl group $-SiCl_nX_{3-n}$ (in which n represents an integer of from 1 to 3; and X represents a hydrogen atom or a $C_{1-10}$ alkyl, alkoxy or acyloxy group) per molecule.

Preferred among these chlorosilyl group-containing compounds is one having at least two chlorine atoms per molecule. In particular, a chlorosilane obtained by substituting at least two hydrogen atoms in a silane $Si_nH_{2n+2}$ (in which n represents an integer of from 1 to 5) by chlorine atoms and the other hydrogen atoms by the above alkyl, alkoxy or acyloxy group, a partial hydrolyzate thereof or a polycondensate thereof is preferred.

Examples of these compounds include tetrachlorosilane ($SiCl_4$), trichlorosilane ($SiHCl_3$), trichloromonomethylsilane ($SiCH_3Cl_3$), dichlorosilane ($SiH_2Cl_2$), and Cl—$(SiCl_2O)_n$—$SiCl_3$ (in which n represents an integer of from 1 to 10). These compounds may be used singly or in combination. Most preferred among these chlorosilyl group-containing compounds is tetrachlorosilane.

As the fluoroalkyl group-containing silane compound employable herein there may be preferably used a silane compound containing a fluoroalkyl group and an alkoxy, acyloxy or chloro group. Examples of such a silane compound include those represented by the following formulae (1) and (2). These compounds may be used singly or in combination.

$$CF_3-(CF_2)_n-R-SiX_pY_{3-p} \quad (1)$$

wherein n represents an integer of from 0 to 12, preferably from 3 to 12; R represents a $C_{2-10}$ divalent organic group (e.g., methylene, ethylene) or a group containing silicon and oxygen atoms; X represents a substituent selected from the group consisting of $C_{1-4}$ monovalent hydrocarbon group (e.g., alkyl, cycloalkyl, allyl) and derivatives thereof or a hydrogen atom; p represents an integer of from 0 to 2; and Y represents a $C_{1-4}$ alkoxy or acyloxy group.

$$CF_3-(CF_2)_n-R-SiX_pCl_{3-p} \quad (2)$$

wherein n represents an integer of from 0 to 12, preferably from 3 to 12; R represents a methylene group, an ethylene group or a group containing silicon and oxygen atoms; X represents a hydrogen atom or a substituent selected from the group consisting of alkyl group, cycloalkyl group, allyl group and derivatives thereof; and p represents an integer of from 0 to 2.

Examples of the compound represented by the chemical formula (1) will be given below.

$CF_3CH_2CH_2Si(OCH_3)_3$

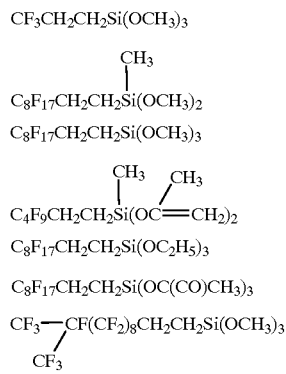

Particularly preferred among these compounds are $C_8F_{17}CH_2CH_2Si(OCH_3)_3$ (3-heptadecafluorodecyltrimethoxysilane) and $C_8F_{17}CH_2CH_2SiCH_3(OCH_3)_2$.

Examples of the compound represented by the chemical formula (2) will be given below.

$CF_3CH_2CH_2SiCl_3$

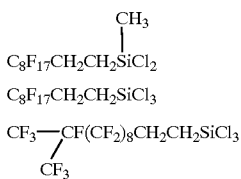

Particularly preferred among these compounds are $C_8F_{17}CH_2CH_2SiCl_3$ (3-heptadecafluorodecyltrichlorosilane) and $C_8F_{17}CH_2CH_2Si(CH_3)Cl_2$.

The solvent to be used in the present invention will be further described hereinafter. As the solvent there may be used a solvent containing an alcohol and/or water content which allows the chloro group in the chlorosilyl group-containing compound to be substituted by alkoxyl group or hydroxyl group, causing dehydrochlorination reaction. For example, an alcoholic hydrophilic solvent, ketonic hydrophilic solvent, etc. are preferably used.

Among these solvents, an alcoholic solvent such as chain saturated monovalent alcohol having 3 or less carbon atoms (e.g., methanol, ethanol, 1-propanol, 2-propanol) may be preferably used because it normally evaporates at a high rate.

Examples of the ketonic hydrophilic solvent include acetone, and methyl ethyl ketone.

The solvent does not need to contain such an alcohol so far as it contains water content in an amount high enough to cause the dehydrochlorination reaction.

Further, the solvent does not need to be made of a hydrophilic solvent alone but may further contain a non-aqueous solvent such as hydrocarbon-based solvent and fluorine-based solvent.

In accordance with the method according to the present invention, a solution of the chlorosilyl group-containing compound and fluoroalkyl group-containing silane compound in a hydrophilic solvent is applied to the surface of a substrate such as glass substrate. During this procedure, various chemical reactions occur between -OH group in the surface of the substrate and the fluoroalkyl group-containing silane compound, chlorosilyl group-containing compound and hydrophilic solvent in the film thus formed.

In some detail, as further mentioned below, the chlorosilyl group undergoes reaction in the solution to form a siloxane bond (—Si—O—Si—) during its preparation, storage and film formation. Some of the siloxane bonds forms another siloxane bond with the fluoroalkyl group-containing silane compound while a part of the rest of the siloxane bonds forms another siloxane bond with the surface of the substrate.

For example, if an alcoholic solvent is used as a solvent, the chlorosilyl group-containing compound in the solution undergoes dehydrochlorination reaction with the alcoholic solvent to produce an alkoxide as shown in the following chemical equation (14). Further, the chlorosilyl group-containing compound undergoes hydrolysis reaction with a small amount of water content contained in the alcoholic solvent or atmosphere to lose hydrogen chloride (dehydrochlorination reaction) as shown in the following chemical equation (15). This dehydrochlorination reaction involves the production of silanol (..Si—OH). In the following chemical equations, R represents an alkyl group.

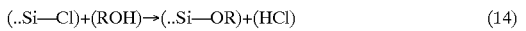  (14)

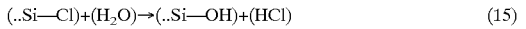  (15)

The hydrochloric acid produced in the alcoholic solvent according to the chemical equations (14) and (15) acts as a catalyst for the following chemical equation (16), and (..Si—OR) partially produces silanol.

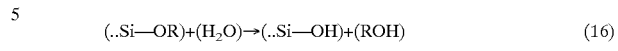  (16)

The silanol produced according to the chemical equations (15) and (16) partially undergoes reaction according to the following chemical equation (17) to produce a siloxane bond (—Si—O—Si—). Another part of the silanol thus produced undergoes dehydrocondensation reaction to produce a siloxane bond as shown in the chemical equation (18).

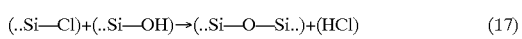  (17)

  (18)

The chloro group in the chlorosilyl group-containing compound has an extremely high reactivity. In the chlorosilyl group-containing compound in the alcoholic solvent, most of the chloro groups undergo reaction to produce (..Si—OR), (..Si—OH), (..Si—O—Si..), and (HCl).

In other words, the solution comprises hydrochloric acid incorporated in the alcoholic solvent besides the silicon alkoxide or hydrolyzate thereof and the fluoroalkyl group-containing silane compound.

Even if the solvent is a hydrophilic solvent other than alcoholic solvent, the chloro group reacts with water content unavoidably contained in the hydrophilic solvent to produce (..Si—OH), (..Si—O—Si..), and (HCl) as shown in the chemical equations (15) and (18).

Accordingly, the chloro group, which has an extremely high reactivity, remains little, providing a solution having a prolonged pot life. Further, the resulting solution is insusceptible to the effect of environmental humidity during working and thus can be easily controlled.

Which occurs in the foregoing solution the hydrolysis reaction shown in the chemical equation (16) or the dehydrocondensation reaction shown in the chemical equation (18) greatly depends on the acid concentration of the solution, the concentration of the alkoxide or hydrolyzate thereof in the solution and the water content of the solution.

The method and solution according to the present invention are characterized in that the dehydrocondensation reaction is inhibited so that the silicon alkoxide in the solution is kept in the form of monomer as much as possible or little polymerized. This solution is applied to the surface of a substrate. When this coated material is dried, the solution suddenly undergoes the reactions shown in the chemical equations (16) and (18) to form a siloxane bond, making it possible to form a dense film at ordinary temperatures.

Accordingly, in the method and solution according to the present invention, the silicon alkoxide or hydrolyzate thereof in the solution is preferably in the form of monomer or polymer of not higher than nonadecamer. However, the solution may contain a polymer of not lower than eicosamer so far as the proportion of the total amount of the monomer, hydrolyzate and polymer of not higher than nonadecamer is not less than 80% by weight based on the total weight of the silicon alkoxide.

The acid to be incorporated in the solution will be further described hereinafter.

For example, if tetrachlorosilane is dissolved in an alcoholic solvent in an amount of 1% by weight, the reaction (14) occurs to produce hydrochloric acid. The resulting solution contains an acid in a concentration of about 0.2N and exhibits a pH of about 0.7. Accordingly, if an alcoholic solvent is used, hydrochloric acid is produced as described above. Therefore, the solution does not have to comprise any acid incorporated therein.

When the concentration of hydrochloric acid is kept at 0.001 to 3N, the resulting solution exhibits a pH of from 0 to 3, making it difficult for the reactions (16) and (18) to occur. As a result, the solution can be kept in the form of silicon alkoxide and hydrolyzate thereof over an extended period of time.

When the concentration of the acid catalyst in the solution falls below 0.001N or exceeds 3N, the partial hydrolyzate of silicon alkoxide in the solution can easily undergo condensation reaction, reducing the pot life of the solution. Further, the acid evaporates away from the film made of the solution during the drying of the film. Therefore, it is necessary that the acid concentration be kept somewhat high.

Accordingly, it is necessary that the lower limit of the acid concentration be not less than 0.001N, preferably not less than 0.01N, and more preferably not less than 0.1N. On the contrary, it is necessary that the upper limit of the acid concentration be not more than 3N, preferably not more than 1N. If the solution is applied to the substrate before the initiation of the foregoing condensation reaction, the acid concentration may deviate from the above defined range.

If the acid concentration in the solution is low for the reason that the solution comprises a chlorosilyl group-containing compound in a small amount or any other reasons, it is preferably adjusted by separately adding an acid to the solution.

If an acid is separately added to the solution, an acid having a concentration of not less than 0.3 times the water content is preferably used. If the acid to be used has a concentration as low as less than 0.3 times the water content, the solution can hardly be kept at a pH value of not more than 3. In other words, the acid, if used in the form of aqueous solution, needs to have a concentration as high as not less than 23.1%.

When the acid is used in the form of solution in ethanol, the concentration of the acid in the solution needs to be not less than 0.15% by weight if the solvent has a water content of 0.5% by weight.

The acid to be incorporated in the solution is preferably a volatile acid such as hydrochloric acid, hydrofluoric acid, nitric acid and acetic acid because it should evaporate away from the film at ordinary temperatures. Among these acids, hydrochloric acid, which exhibits a high volatility and can be handled with relative safety, is particularly desirable.

The concentration of silicon alkoxide or hydrolyzate and condensate thereof in the solution is preferably as low as possible to make it difficult for the reactions (16) and (18) to occur. Therefore, the total amount of the chlorosilyl group-containing compound and the fluoroalkyl group-containing compound is preferably not more than 10% by weight.

If the thickness of the water-repellent film thus obtained is from 5 to 200 nm, the durability of the water-repellent film can be enhanced. Accordingly, the total concentration of the chlorosilyl group-containing compound and the fluoroalkyl group-containing compound is preferably from 0.01 to 10% by weight, though depending on the coating method. If the solution is applied to the substrate before the initiation of the condensation reaction, the total concentration of the chlorosilyl group-containing compound and the fluoroalkyl group-containing compound may deviate from the above defined range.

If the total concentration of the chlorosilyl group-containing compound and the fluoroalkyl group-containing compound falls below 0.01% by weight, the thickness of the water-repellent film thus obtained must be less than 5 nm, though depending on the coating method. As a result, an alkaline component, if any contained in the substrate, cannot be prevented from being diffused, deteriorating the durability of the water-repellent film.

On the contrary, if the total concentration of the chlorosilyl group-containing compound and the fluoroalkyl group-containing compound exceeds 10% by weight, the thickness of the water-repellent film thus obtained is more than 200 nm, though depending on the coating method. The resulting water-repellent film is liable to have scuff, making it impossible to form a rigid film.

In order to inhibit undesirable coloring due to light interference, the total concentration of the chlorosilyl group-containing compound and the fluoroalkyl group-containing compound is more preferably from 0.1 to 5% by weight. In this case, the thickness of the water-repellent film thus obtained is more preferably from 10 to 100 nm.

The lower the water content of the solution is, the more difficultly the reactions (16) and (18) can occur.

On the contrary, if the solution has a great water content, the hydrolysis reaction of the partial hydrolyzate of silicon alkoxide in the solution is accelerated. Further, dehydrocondensation reaction can easily occur in the solution. As a result, the resulting solution exhibits a reduced pot life. Further, the film obtained by applying and drying the solution is liable to nonuniformity of thickness.

Accordingly, in order to prolong the pot life of the solution and eliminate the nonuniformity of the thickness of the film thus obtained, the water content in the solution is preferably as low as possible. Therefore, the water content in the solution is preferably from 0 to 20% by weight, more preferably from 0 to 10% by weight, and most preferably from 0 to 2% by weight.

By thus adjusting and maintaining the water content in the solution, the reactions (16) and (18) can be easily inhibited.

Even if the water content in the solution is zero, the film obtained by applying and drying the solution absorbs water content in the air, preventing the inhibition of the hydrolysis reaction.

A hydrophilic solvent, e.g., alcoholic solvent normally absorbs water content and thus unavoidably has some water content. As a result, the solution has a water content of not less than 0.1% by weight. Thus, in some cases, the solution does not need to comprise water content incorporated therein.

When the foregoing solution is applied to the substrate, the solvent evaporates away from the film thus formed, causing a sudden rise in the concentration of silicon alkoxide or hydrolyzate thereof in the film and hence causing sudden occurrence of the hydrolysis reaction and dehydrocondensation reaction (including polycondensation reaction of the polymer of not higher than nonadecamer) which has been inhibited. In other words, a large number of siloxane bonds (..Si—O—Si..) are produced in the film. As a result, a film mainly composed of silicon oxide having a strong bond between the surface of the substrate and the water-repellent film can be formed.

In accordance with the above method of the present invention, the hydrolysis reaction and dehydrocondensation reaction during film forming can occur very smoothly and thus can occur thoroughly at room temperature, making it possible to form a very dense film. Therefore, the method according to the present invention requires no subsequent calcining step if the resulting water-repellent articles are used for ordinary purposes.

The orientation of the fluoroalkyl group will be described hereinafter.

The alkoxy group (or acyloxy group or chlorine atom) in the fluoroalkyl group-containing silane compound in the solution undergoes almost the same reaction as the silicon alkoxide. The fluoroalkyl group has a low surface energy. Therefore, when the solution is applied to the substrate, the fluoroalkylsilane component spontaneously moves outside the film thus formed. Thus, the fluoroalkyl group-containing silane compound is regularly oriented in such an arrangement that the fluoroalkyl group moiety faces outside the film.

In the outermost layer of the film, the fluoroalkyl group is present in a higher concentration than in the inner layer of the film. As the drying of the film proceeds, the alkoxy group in the silicon alkoxide and the alkoxy group (or acyloxy group or chlorine atom) in the fluoroalkyl group-containing silane compound undergo the reactions (16) and (18) while the fluoroalkyl group-containing silane compound is being kept oriented. Further, the fluoroalkyl group-containing silane compound is strongly bonded to silicon alkoxide via siloxane bond. Finally, a gel layer of a fluoroalkylsilane-modified silanol polymer is formed.

As the drying of the film thus formed proceeds, a layer mainly composed of strongly bonded silicon oxide is formed on the substrate, and fluoroalkyl groups are bonded to the silicon oxide layer at a high density in a regularly oriented state.

In the method according to the present invention, the fluoroalkyl group-containing silane compound exists with silicon alkoxide in the solvent so that it undergoes reaction represented by the chemical equation (16) or (18) in the solution or during film forming to produce silicon alkoxide and siloxane bond. Thus, the fluoroalkyl group as a water-repellent group is oriented facing outside the film during film forming to form a water-repellent film.

In the method according to the present invention, the acid concentration in the solution is raised to enhance the reactivity during film forming. Thus, the solution according to the present invention can form a very dense film at room temperature. The reaction represented by the chemical equation (16), i.e., reaction in which silicon atoms in silicon alkoxide form a siloxane bond, and the reaction represented by the chemical equation (18), i.e., reaction in which the silicon atom in the surface of the substrate and the silicon atom in silicon alkoxide form a siloxane bond can occur more easily than the reaction in which the fluoroalkyl group-containing silane compound forms a siloxane bond with silicon alkoxide, making it easy for fluoroalkyl groups to gather in the outermost layer of the film. Accordingly, the resulting water-repellent film has a high water-repellent group density in the outermost layer.

If the content of the fluoroalkyl group-containing silane compound based on the chlorosilyl group-containing compound in the solution is too small, the resulting water-repellent film exhibits a deteriorated water repellency. On the contrary, if the content of the fluoroalkyl group-containing silane compound based on the chlorosilyl group-containing compound in the solution is too great, the resulting water-repellent film exhibits a deteriorated durability.

Accordingly, the solution preferably comprises the chlorosilyl group-containing compound and the fluoroalkyl group-containing silane compound in a proportion Si(Cl) of 100 and Si(F) of 0.05 to 50, more preferably from 0.05 to 30, and most preferably from 0.05 to 3, wherein Si(Cl) represents the number of silicon atoms in said chlorosilyl group-containing compound and Si(F) represents the number of silicon atoms in said fluoroalkyl group-containing silane compound.

If hydrolysis reaction and polycondensation reaction occur in the solution, a dense film cannot be obtained. In order to obtain a dense film, a step of calcining the film at a temperature of 250° C. for about 1 hour or longer is required. The rise in the temperature during this calcining step causes an alkaline component in the substrate to diffuse into the film, inhibiting the water-repellent effect of the fluoroalkyl group.

On the other hand, the film obtained according to the present invention has a sufficient denseness and thus essentially does not need to be calcined.

Further, in accordance with the method according to the present invention, the water-repellent film-forming solution which has been applied to the surface of the substrate may or may not be dried at a temperature of from room temperature to 150° C., and then calcined at a temperature of from the drying temperature to 300° C. for the purpose of further enhancing the denseness of the water-repellent film.

In this case, the uncalcined film has a sufficient denseness and thus can be protected against the diffusion of an alkaline component that adversely affects the durability of the film.

Further, the water-repellent film on the water-repellent articles obtained according to the present invention is characterized by its very excellent surface smoothness. The water-repellent film has an arithmetic mean roughness (Ra) of 0.5 nm or less and a roughness (Rz) of 5 nm or less on the average over 10 points. These surface roughnesses Ra and Rz can be determined by a method three-dimensionally extended from JIS B 0601-1982, which is two-dimensionally defined.

One of the reasons why the water-repellent film has excellent water droplet rollability and scuff resistance is probably the surface smoothness as mentioned above. The reason why this surface smoothness can be obtained will be described hereinafter.

In the above solution, silicon alkoxide and fluoroalkyl group-containing silane compound, particularly silicon alkoxide, exist in the form of monomer (including hydrolyzate) or polymer of not higher than nonadecamer and thus can be uniformly dissolved in the solvent. Accordingly, the film obtained by applying the foregoing solution to the surface of the substrate has a uniform thickness.

As the drying of the film thus applied proceeds, the film-forming reaction rapidly proceeds and ends in a short period of time while the thickness of the film is being kept uniform. As a result, a film having an excellent smoothness is formed.

Further, in accordance with the method according to the present invention, the water-repellent group is spontaneously oriented during film forming, making it possible to form a water-repellent layer having a better orientation than by the conventional post-treatment for water repellency such as chemical adsorption and hand painting. Accordingly, in accordance with the present invention, the resulting water-repellent film has a high water-repellent group density in the surface layer thereof and exhibits an excellent water-repellent group orientation and a good surface smoothness. With these properties combined, the water-repellent film exhibits excellent water droplet rollability, weathering resistance and scuff resistance.

The solution according to the present invention is produced by a method which comprises adding a fluoroalkyl group-containing silane compound to a solvent containing an alcohol and/or water content, stirring the mixture for 10 to 60 minutes, adding a chlorosilyl group-containing compound to the mixture, and then stirring the mixture for 10 to 60 minutes. The solution thus produced has a very long pot life. However, if the solution has a relatively small or large amount of an acid or a large amount of the chlorosilyl group-containing compound or a great water content, it is likely that hydrolysis reaction and polycondensation reaction can proceed in the solution. Therefore, the solution is preferably treated within 2 hours after produced. The solution thus produced can be applied to the surface of a substrate, and then dried at room temperature for 10 seconds to 10 minutes to cause the solvent to evaporate away, thereby producing a water-repellent article.

In accordance with the method according to the present invention, the water-repellent group is spontaneously oriented during film forming. Thus, as the method for coating the solution there may be preferably used a method which allows the coating layer to be dried somewhat slowly. Examples of such a coating method include dip coating method, flow coating method, curtain coating method, spin coating method, spray coating method, bar coating method, roll coating method, and brush coating method.

Thus, water-repellent articles comprising a water-repellent repellent film formed thereon having a high denseness and excellent surface smoothness, water-repellent group denseness and water-repellent group orientation can be obtained. The water-repellent articles according to the present invention exhibit an excellent water droplet rollability and high scuff resistance and weathering resistance.

As the substrate employable herein there may be used one having hydrophilic groups in the surface layer thereof. Specific examples of such a substrate include glass, ceramics, plastic, and metal. If the substrate contains a small amount of hydrophilic groups in the surface layer thereof, it is preferably subjected to hydrophilic treatment such as treatment in a plasma or corona atmosphere containing oxygen and irradiation with ultraviolet ray having a wavelength close to 200 to 300 nm in an atmosphere containing oxygen before use.

The present invention will be further described in the following examples, but the present invention should not be construed as being limited thereto.

EXAMPLE 1

To 100 g of ethanol (water content: 0.35% by weight) was added 0.02 g of 3-heptadecafluorodecyltrimethoxysilane ($CF_3(CF_2)_7(CH_2)_2Si(OCH_3)_3$; produced by Shin-Etsu Silicone Co., Ltd.). The mixture was then stirred for 30 minutes. To the mixture was then added 1.0 g of tetrachlorosilane ($SiCl_4$, produced by Shin-Etsu Silicone Co., Ltd.) with stirring to obtain a solution for forming a water-repellent film. The solution thus obtained had Si(F):Si(F) ratio of 100:0.6, a hydrochloric acid concentration of about 0.2N, a water content of 0.35 wt % and a pH of about 0.7.

The solution was then measured by means of a Fourier transform nuclear magnetic resonance spectrometer (FT-NMR; EX270®, produced by JEOL LTD.). As a result, the solution showed an absorption peak at a chemical shift of 82 ppm indicating the presence of tetraethoxysilane (and (partial) hydrolyzate thereof) and an absorption peak at a chemical shift of 96 ppm indicating the presence of trimer of tetraethoxysilane. No absorption peak indicating the presence of polymers of not lower than tetramer was detected.

The solution thus obtained was applied to the surface of a cleaned substrate (150 mm×150 mm) by flow coating method at room temperature and a humidity of 30%, and then dried at room temperature for about 1 minute to obtain a water-repellent glass plate.

The ratio of Si(F) to Si(Cl) 100 in the solution, the normality of hydrochloric acid in the solution, the water content (wt %) of the solution, the pH of the solution, and the degree of polymerization of the polymer are shown in Table 1.

The water-repellent glass substrate thus obtained was then measured for contact angle with respect to water as determined in terms of static contact angle with respect to water droplet having a weight of 2 mg (hereinafter occasionally referred to as "CA") by means of a contact angle meter (CA-DT, produced by Kyowa Interface Science Corporation Limited). The greater the contact angle is, the better is the static water repellency.

As a measure of the rollability of water droplet over the surface of the water-repellent glass plate there was used the angle of inclination (critical angle of inclination, hereinafter occasionally referred to as "IA") of the glass plate at which a water droplet having a diameter of 5 mm begins to roll thereover. The smaller IA is, the better is the dynamic water repellency. For example, such a water-repellent glass plate, if used as a window screen in automobiles, can allow raindrops to scatter in the wind, thereby giving the operator a good visibility during driving.

For the measurement of the surface smoothness of the water-repellent glass thus obtained, an interatomic force microscope (AFM) (Type SPI3700 scanning probe microscope, produced by Seiko Instrument Inc.; cantilever: SI-DF20) was used. The specimen was measured for surface shape at 512×256 points on 1 $\mu$m×1 $\mu$m square area at a scanning speed of 1.02 Hz in DFM (cyclic contact mode). The measurements were then subjected to correction by low pass filter. The data were subjected to correction by leveling (curve fitting by least squares approximation, data inclination correction, and elimination of strain in Z axis). The surface roughnesses Ra and Rz were then calculated.

For the measurement of the fluorine concentration in the surface of the film on the water-repellent glass plate thus obtained, X-ray photoelectric spectrophotometry (5600Ci, produced by Albackfi Co., Ltd.) was used. The ratio of F/Si in the surface of the film was determined. The measurement by X-ray photoelectric spectrophotometry was effected using a monochromatic aluminum K$\alpha$ ray as an X-ray source at an anode energy of 1486.6 eV, an anode output of 150 W, an acceleration voltage of 14 kV, and an X-ray inclination angle of 45 degree with respect to the specimen. The area to be analyzed was a circle having a diameter of 800 $\mu$m. The thickness to be measured was several nanometers.

For the measurement of weathering resistance, an ultraviolet light resistance testing machine (Type W-13 Eyesuper UV tester, produced by IWASAKI ELECTRIC CO., LTD.) was used. The specimen was irradiated with ultraviolet rays at an intensity of 76±2 mW/cm$^2$ and a black panel temperature of 48±2° C. for 20 hours, and then stored in the dark for 4 hours. During this cycle, the specimen was showered with ion-exchanged water for 30 seconds every 1 hour. This cycle was repeated until the specimen was irradiated with ultraviolet rays for 400 hours in total. The specimen thus weathered was then measured for CA and IA.

For the measurement of abrasion resistance, a dry cloth mounted on a reciprocating abrasion tester (produced by Shinto Kagaku K.K.) was allowed to slide over the water-repellent film back and forth under a load of 0.3 kg/cm$^2$ 3,000 times. The specimen thus treated was then measured for CA and IA.

The thickness of the water-repellent film was measured by means of a transmission electron microscope.

The measurements of the thickness of the water-repellent film, initial CA and IA of the water-repellent film, the fluorine concentration (F/Si ratio) in the surface of the water-repellent film, the surface roughnesses Ra and Rz of the water-repellent film, CA and IA of the water-repellent film thus weathered, and CA and IA of the water-repellent film thus abraded are set forth in Table 2.

EXAMPLE 2

The water-repellent glass plate obtained in Example 1 was then calcined at a temperature of 250° C. for 1 hour to obtain a water-repellent glass. The water-repellent glass thus obtained was then measured for various properties in the same manner as in Example 1. The results are shown in Tables 1 and 2.

EXAMPLES 3 AND 4

The procedure of Example 1 was followed except that 3-heptadecafluorodecyltrimethoxysilane was added in an amount of 0.005 g and 0.05 g, respectively, in the process for the preparation of the solution for forming a water-repellent film to obtain water-repellent glass plates of Examples 3 and 4.

The solution thus obtained contained tetrachlorosilane and 3-heptadecafluorodecyltrimethoxysilane in an amount of 0.15 (Example 3) and 1.5 (Example 4) as calculated in terms of Si(F) based on 100 of Si(Cl). These water-repellent glass plates were then measured for various properties in the same manner as in Example 1. The results are shown in Tables 1 and 2.

EXAMPLES 5 AND 6

The procedure of Example 1 was followed except that the added amount of tetrachlorosilane was changed from 1.0 g to 0.5 g and 2.0 g, respectively, in the process for the preparation of the solution for forming a water-repellent film to obtain water-repellent glass plates of Examples 5 and 6.

The solution thus obtained contained tetrachlorosilane and 3-heptadecafluorodecyltrimethoxysilane in an amount of 1.2 (Example 5) and 0.3 (Example 6) as calculated in terms of Si(F) based on 100 of Si(Cl). These water-repellent glass plates were then measured for various properties in the same manner as in Example 1. The results are shown in Tables 1 and 2.

EXAMPLE 7

To 100 g of ethanol (water content: 0.35% by weight) was added 0.1 g of 3-heptadecafluorodecyltrimethoxysilane. The mixture was then stirred for 30 minutes. To the mixture was then added 5.0 g of tetrachlorosilane with stirring to obtain a solution for forming a water-repellent film.

The solution thus obtained contained tetrachlorosilane and 3-heptadecafluorodecyltrimethoxysilane in an amount of 0.6 as calculated in terms of Si(F) based on 100 of Si(Cl).

A cleaned glass substrate (150 mm×150 mm) was dipped in the solution at room temperature and a humidity of 30%. The substrate was taken out of the solution at a rate of 10 cm/min, and then dried at room temperature for about 1 minute to obtain a glass plate with a water-repellent film. The glass plate was then measured in the same manner as in Example 1. The results are shown in Tables 1 and 2.

EXAMPLE 8

A glass plate with a water-repellent film was obtained in the same manner as in Example 1 except that 0.02 g of 3-heptadecafluorodecyltrichlorosilane ($CF_3(CF_2)_7(CH_2)_2$ $SiCl_3$) was added instead of 0.02 g of 3-heptadecafluorodecyl trimethoxysilane in the process for the preparation of solution.

The solution thus obtained contained tetrachlorosilane and 3-heptadecafluorodecyltrichlorosilane in an amount of 0.6 as calculated in terms of Si(F) based on 100 of Si(Cl). The water-repellent glass plate was then measured for various properties in the same manner as in Example 1. The results are shown in Tables 1 and 2.

EXAMPLE 9

To 100 g of ethanol (water content: 0.35% by weight) was added 0.02 g of 3-heptadecafluorodecyltrimethoxysilane ($CF_3(CF_2)_7(CH_2)_2Si(OCH_3)_3$; produced by Shin-Etsu Silicone Co., Ltd.). The mixture was then stirred for 30 minutes. To the mixture was then added 0.3 g of tetrachlorosilane ($SiCl_4$, produced by Shin-Etsu Silicone Co., Ltd.) with stirring. To the mixture was then added 2 g of concentrated hydrochloric acid (35% by weight, produced by Kanto Chemical Co., Ltd.) with stirring to obtain a solution for forming a water-repellent film.

The solution thus obtained contained tetrachlorosilane and 3-heptadecafluorodecyltrimethoxysilane in an amount of 2.0 as calculated in terms of Si(F) based on 100 of Si(Cl).

The solution thus obtained was applied to the surface of a cleaned substrate (150 mm×150 mm) by flow coating method at room temperature and a humidity of 30%, and then dried at room temperature for about 1 minute to obtain a glass plate with a water-repellent film. The glass plate thus obtained was then measured for various properties in the same manner as in Example 1. The results are shown in Tables 1 and 2.

EXAMPLE 10

A glass plate with a water-repellent film was obtained in the same manner as in Example 1 except that 90 g of ethanol (water content: 0.35% by weight) and 10 g of an isoparaffin-based hydrocarbon solvent (Isoper L, produced by Exon) were added instead of 100 g of ethanol (water content: 0.35% by weight) in the process for the preparation of solution for forming a water-repellent film. The composition of the solution for forming a water-repellent film is set forth in Table 1. The glass plate thus obtained was measured for various properties in the same manner as in Example 1. The results are shown in Tables 1 and 2.

EXAMPLE 11

A glass plate with a water-repellent film was obtained in the same manner as in Example 1 except that 90 g of ethanol and 10 g of water were added instead of 100 g of ethanol (water content: 0.35% by weight) in the process for the preparation of solution for forming a water-repellent film. The composition of the solution for forming a water-repellent film is shown in Table 1. The glass plate thus obtained was measured for various properties in the same manner as in Example 1. The results are shown in Tables 1 and 2.

EXAMPLE 12

A glass plate with a water-repellent film was obtained in the same manner as in Example 1 except that the added amount of tetrachlorosilane was changed from 1.0 g to 0.05 g in the process for the preparation of solution for forming a water-repellent film. The composition of the solution for forming a water-repellent film is shown in Table 1. The glass plate thus obtained was measured for various properties in the same manner as in Example 1. The results are shown in Tables 1 and 2.

The glass plates with a water-repellent film obtained in Examples 1 to 12 exhibited an initial CA of not less than 100 degrees and an initial IA of not more than 9 degrees, demonstrating that they exhibit an excellent water repellency. After weathering test, these glass plates exhibited CA of not less than 80 degrees, though showing a slight reduction in water repellency. After abrasion test, these glass plates exhibited CA of not less than 98 degrees, demonstrating that they exhibit an excellent durability.

The water-repellent film had a thickness of from 5 to 100 nm, a surface roughness Ra of not more than 0.5 nm and a surface roughness Rz of not more than 5 nm, demonstrating that it exhibits an excellent surface smoothness.

Referring to the fluorine concentration in the surface of the film, these examples each exhibited F/Si ratio of not less than 0.8 because the hydrolysis reaction and dehydrocondensation reaction in the solution were inhibited. It was confirmed that a large amount of fluoroalkyl groups are present in the outermost layer of the water-repellent film and the inner layer of the water-repellent film is substantially composed of silicon oxide.

The solutions for forming a water-repellent film obtained in the foregoing examples did not undergo gelation and thus could be used without any problems.

COMPARATIVE EXAMPLE 1

To 81.2 g of ethanol (water content: 0.35% by weight) were added 9.5 g of tetraethoxysilane and 0.26 g of 3-heptadecafluorodecyltrimethoxysilane. The mixture was then stirred for 30 minutes. To the mixture were then added 4.04 g of water and 5.0 g of a 0.1 N hydrochloric acid. The mixture was then stirred for 10 days. The solution was then diluted with ethanol five times to obtain a solution for forming a water-repellent film. The solution thus obtained was then applied to a cleaned glass substrate (150 mm×150 mm) at room temperature and a humidity of 30% by flow coating method, dried, and then calcined at a temperature of 250° C. for 1 hour to obtain a glass plate with a water-repellent film. The glass plate was then measured for various properties. The results are shown in Tables 1 and 2.

Si(F) of Comparative Examples 1 and 2 in Table 1 indicates the ratio of the number of silicon atoms in the fluoroalkyl group-containing silane compound to the number of silicon atoms in tetraethoxysilane as 100.

Comparative Example 1 is an example in which the content of hydrochloric acid is smaller than the foregoing examples. In this comparative example, the hydrolysis reaction and dehydrocondensation reaction of silicon alkoxide and fluoroalkyl group-containing silane compound proceeded in the solution.

Comparative Example 1 and the following Comparative Example 2 are duplication of JP-A-4-338137 decsribed before.

COMPARATIVE EXAMPLE 2

To 85.3 g of ethanol (water content: 0.35% by weight) were added 40 g of tetraethoxysilane and 1.92 g of 3-heptadecafluorodecyltrimethoxysilane. The mixture was then stirred for 20 minutes. To the mixture were then added 16.6 g of water and 20.8 g of a 0.1 N hydrochloric acid. The mixture was then stirred for 2 hours. The mixture was put into a sealable vessel which was then sealed. The mixture was then allowed to stand at a temperature of 25° C. for 24 hours to obtain a solution for forming a water-repellent film. The solution thus obtained contained a triancontamer of tetraethoxysilane.

A cleaned glass substrate (150 mm×150 mm) was dipped in the solution. The coated material was dried, and then calcined at a temperature of 250° C. for 1 hour to obtain a glass plate with a water-repellent film. The glass plate thus obtained was then measured for various properties. The results are set forth in Tables 1 and 2.

Comparative Example 2 is an example in which the water content is greater than the foregoing examples. In this example, the hydrolysis reaction and dehydrocondensation reaction of silicon alkoxide and fluoroalkyl group-containing silane compound proceeded in the solution.

COMPARATIVE EXAMPLE 3

To 40 g of $CF_3CF_2CHCl_2$ (Asahiklean AK-225, produced by Asahi Glass Co., Ltd.) as a flon solvent were added 1 g of tetrachlorosilane and 1 g of 3-heptadecafluorodecyl trichlorosilane. The mixture was stirred for 30 minutes to obtain a solution for forming a water-repellent film. The solution thus obtained was applied to a cleaned glass substrate (150 mm×150 mm) with a cotton pad at room temperature and a humidity of 30%, dried, and then calcined at a temperature of 93° C. for 1 hour. Excess silane was then removed from the surface of the glass plate thus calcined with a solvent to obtain a glass plate with a water-repellent film. The glass plate thus obtained was then measured for various properties. The results are shown in Tables 1 and 2.

Comparative Example 3 above and the following Comparative Example 4 are duplication of JP-A-8-239653 described above.

COMPARATIVE EXAMPLE 4

To 79.24 g of an isoparaffin-based hydrocarbon solvent (Isoper L, produced by Exon) were added 0.36 g of tetrachlorosilane and 0.4 g of 3-heptadecafluorodecyl trichlorosilane. The mixture was then stirred for 30 minutes to obtain a solution for forming a water-repellent film. The solution thus obtained was applied to a cleaned glass substrate (150 mm×150 mm) at room temperature and a humidity of 30% by flow coating method, and then dried. Excess silane was then removed from the glass substrate with a solvent to obtain a glass plate with a water-repellent film. The glass plate thus obtained was then measured for various properties. The results are shown in Tables 1 and 2.

As can be seen in Tables 1 and 2, all the water-repellent glass plates obtained in Comparative Examples 1 to 4 exhibited an initial CA as high as not less than 101 degrees but IA as high as not less than 15 degrees, demonstrating that they exhibit a poor waterdrop rollability.

Referring to the surface smoothness of the water-repellent films thus obtained, Comparative Examples 1 and 2 exhibited a relatively good surface smoothness while Comparative Examples 3 and 4 exhibited a poor surface smoothness.

Referring to weathering resistance, Comparative Examples 1 and 2 exhibited poor CA and IA as compared with the examples after weathering test. Comparative Examples 3 and 4 exhibited CA equal to that of the examples but poor IA as compared with the examples after weathering test.

Referring to abrasion resistance, all the comparative examples exhibited poor CA and IA as compared with the examples after abrasion test.

Referring to the fluorine concentration in the surface of the film, Comparative Examples 1 and 2 exhibited F/Si ratio as low as 0.5 and 0.6, respectively, because the hydrolysis reaction and dehydrocondensation reaction proceeded in the solution, demonstrating that these water-repellent films have a small content of fluoroalkyl group. Fluorine was detected also in the inner layer of the films.

It was thus confirmed that the water-repellent articles obtained according to the present invention have a very high fluorine concentration in the surface of the water-repellent film.

TABLE 1

| Sample | Si(F)* | HCl (N) | Water content (wt-%) | pH | Degree of polymerization of polymer |
|---|---|---|---|---|---|
| Example 1 | 0.6 | 0.19 | 0.35 | 0.73 | 1 to 3 |
| Example 3 | 0.15 | 0.19 | 0.35 | 0.73 | 1 to 3 |
| Example 4 | 1.5 | 0.19 | 0.35 | 0.73 | 1 to 3 |
| Example 5 | 1.2 | 0.09 | 0.35 | 1.03 | 1 to 3 |
| Example 6 | 0.3 | 0.37 | 0.34 | 0.43 | 1 to 3 |
| Example 7 | 0.6 | 0.92 | 0.33 | 0.04 | 1 to 10 |
| Example 8 | 0.6 | 0.19 | 0.35 | 0.73 | 1 to 3 |
| Example 9 | 2.0 | 0.21 | 1.61 | 0.68 | 1 to 3 |
| Example 10 | 0.6 | 0.19 | 0.31 | 0.73 | 1 to 3 |
| Example 11 | 0.6 | 0.19 | 10.23 | 0.72 | 1 to 5 |
| Example 12 | 12.0 | 0.009 | 0.35 | 2.03 | 1 to 3 |
| Comparative Example 1 | 1.0 | 0.008 | 2.14 | 3.09 | 4 to 30 |
| Comparative Example 2 | 1.8 | 0.014 | 22.8 | 1.86 | 4 to 30 |
| Comparative Example 3 | 29.3 | — | — | — | 1 |
| Comparative Example 4 | 32.4 | — | — | — | 1 |

*Si(F) indicates the ratio of Si(F) to 100 of Si(Cl).

TABLE 2

| | Film thickness | Initial | | F/Si (atomic | Surface roughness | | Weathering resistance | | Abrasion resistance | |
|---|---|---|---|---|---|---|---|---|---|---|
| Sample | (nm) | CA | IA | ratio) | Ra | Rz | CA (°) | IA (°) | CA (°) | IA (°) |
| Example 1 | 60 | 111 | 5 | 1.2 | 0.4 | 2.9 | 83 | 20 | 106 | 8 |
| Example 2 | 60 | 110 | 6 | 1.1 | 0.4 | 3.8 | 85 | 18 | 107 | 9 |
| Example 3 | 60 | 104 | 9 | 0.8 | 0.3 | 2.8 | 80 | 21 | 103 | 10 |
| Example 4 | 60 | 111 | 5 | 1.3 | 0.3 | 3.1 | 85 | 19 | 99 | 10 |
| Example 5 | 30 | 110 | 6 | 1.1 | 0.5 | 4.6 | 80 | 22 | 98 | 12 |
| Example 6 | 100 | 109 | 6 | 1.0 | 0.2 | 1.8 | 88 | 17 | 105 | 9 |
| Example 7 | 80 | 111 | 4 | 1.3 | 0.3 | 2.6 | 87 | 17 | 106 | 8 |
| Example 8 | 60 | 111 | 5 | 1.2 | 0.4 | 3.3 | 84 | 19 | 105 | 10 |
| Example 9 | 20 | 110 | 5 | 1.2 | 0.5 | 4.8 | 82 | 20 | 98 | 11 |
| Example 10 | 60 | 110 | 6 | 1.2 | 0.4 | 4.2 | 84 | 19 | 104 | 10 |
| Example 11 | 60 | 109 | 6 | 1.2 | 0.4 | 4.3 | 80 | 20 | 105 | 9 |
| Example 12 | 5 | 106 | 8 | 1.0 | 0.5 | 4.7 | 86 | 18 | 98 | 11 |
| Comparative Example 1 | 60 | 101 | 15 | 0.5 | 0.3 | 6.2 | 65 | 35 | 96 | 18 |
| Comparative Example 2 | 100 | 102 | 18 | 0.6 | 0.6 | 8.6 | 67 | 38 | 97 | 20 |
| Comparative Example 3 | 10 | 112 | 34 | 1.3 | 7.9 | 29.8 | 85 | 33 | 71 | 39 |
| Comparative Example 4 | 10 | 110 | 18 | 1.1 | 3.2 | 19.3 | 83 | 22 | 38 | 46 |

As described above, in accordance with the present invention, articles coated with a dense rigid water-repellent film can be obtained even if treatment is effected at ordinary temperatures. In the present invention, the water-repellent film which has been formed does not essentially need to be calcined. As a result, no calcining facilities are required, reducing the production cost.

In the present invention, the solution for forming a water-repellent film comprises a fluoroalkyl group-containing silane compound incorporated therein as a water-repellent group. Thus, a layer mainly composed of silica and a water-repellent layer can be formed merely by applying one kind of a solution. Accordingly, an excellent productivity can be attained.

Further, since silica content can easily gather at the surface of the substrate during film forming while the water-repellent group can be easily oriented in the outermost layer of the film during film forming, the resulting water-repellent film exhibits a high water-repellent group density in the outermost layer, a high denseness and an excellent durability.

Since a dense water-repellent film can be formed at ordinary temperatures, the resulting water-repellent film has an extremely excellent surface smoothness. Because of its good orientation of water-repellent group, good surface smoothness and high water-repellent group density in the outermost layer, the water-repellent articles according to the present invention can be provided with very excellent water-drop rollability, scuff resistance and weathering resistance.

The production method and solution for forming a water-repellent film according to the present invention allow easy control over the environmental humidity during storage and coating.

While the invention has been described in detail and with reference to specific embodiments thereof, it will be apparent to one skilled in the art that various changes and modifications can be made therein without departing from the spirit and scope thereof.

What is claimed is:
1. A method for producing water-repellent articles, which comprises dissolving a chlorosilyl group-containing compound and a fluoroalkyl group-containing silane compound in a solvent containing an alcohol and/or water content to obtain a solution having the chloro group in said chlorosilyl group-containing compound substituted by an alkoxyl group or hydroxyl group, applying said solution to the surface of a substrate, and then drying the coated material to form a water-repellent film.

2. The method for producing water-repellent articles as claimed in claim 1, wherein said solution contains an acid and water content in a concentration satisfying the following relationships, respectively:

$$0.001 \leq S \leq 3; \text{ and}$$

$$0 \leq W \leq 20$$

wherein S represents a concentration of the acid (normal); and W represents a concentration of the water content (% by weight), and the proportion of said chlorosilyl group-containing compound and said fluoroalkyl group-containing silane compound dissolved in said solution is 100:0.05 to 50 as calculated in terms of Si(Cl):Si(F) wherein Si(Cl) represents the number of silicon atoms in said chlorosilyl group-containing compound and Si(F) represents the number of silicon atoms in said fluoroalkyl group-containing silane compound.

3. The method for producing water-repellent articles as claimed in claim 2, wherein the concentration of said acid and said water content satisfy the following relationships, respectively:

$$0.01 \leq S \leq 1; \text{ and}$$

$$0 \leq W \leq 10$$

and said proportion Si(Cl):Si(F) is 100:0.05 to 30.

4. The method for producing water-repellent articles as claimed in claim 3, wherein the concentration of said acid and said water content satisfy the following relationships, respectively:

$$0.1 \leq S \leq 1; \text{ and}$$

$$0 \leq W \leq 2$$

and said proportion Si(Cl):Si(F) is 100:0.05 to 3.

5. The method for producing water-repellent articles as claimed in claim 1, wherein said solution comprises said chlorosilyl group-containing compound and said fluoroalkyl group-containing silane compound dissolved therein in a total amount of from 0.01 to 10% by weight.

6. The method for producing water-repellent articles as claimed in claim 1, wherein said chlorosilyl group-containing compound is tetrachlorosilane.

7. The method for producing water-repellent articles as claimed in claim 1, wherein said fluoroalkyl group-containing silane compound is a silane compound containing a fluoroalkyl group and an alkoxyl group, acyloxy group or chlorine atom.

8. The method for producing water-repellent articles as claimed in claim 1, wherein said fluoroalkyl group-containing silane compound is 3-heptadecafluorodecyl trimethoxysilane or 3-heptadecafluorodecyltrichlorosilane.

9. The method for producing water-repellent articles as claimed in claim 1, wherein said solvent is a hydrophilic solvent.

10. The method for producing water-repellent articles as claimed in claim 9, wherein said solvent is an alcoholic solvent.

11. The method for producing water-repellent articles as claimed in claim 1, wherein said substrate is one containing a hydrophilic group in the surface thereof.

12. The method for producing water-repellent articles as claimed in claim 1, wherein said solution further comprises an acid dissolved therein.

13. The method for producing water-repellent articles as claimed in claim 12, wherein the concentration of said acid is not less than 0.3 times the water content of said solution.

14. The method for producing water-repellent articles as claimed in claim 12, wherein said acid is hydrochloric acid.

15. The method for producing water-repellent articles as claimed in claim 1, wherein said solution has a pH of from 0 to 3.

16. The method for producing water-repellent articles as claimed in claim 1, wherein said water-repellent film has a thickness of from 5 to 200 nm.

17. A water-repellent article obtained by a method as claimed in claim 1, characterized in that the surface of said water-repellent film has an arithmetic mean roughness (Ra) of not more than 0.5 nm and a roughness (Rz) of not more than 5 nm on the average over 10 points.

18. A water-repellent article obtained by a method claimed in claim 1, characterized in that the fluorine concentration in the surface of said water-repellent film is not less than 0.8 as calculated in terms of ratio of fluorine atom to silicon atom.

19. A method for producing water-repellent articles, which consists essentially of applying a solution consisting essentially of a silicon alkoxide or hydrolyzate thereof in the form of a monomer or polymer of not higher than nonadecamer, a fluoroalkyl group-containing silane compound and an acid, applying said solution to a substrate, and then drying the coated material to form a water-repellent film.

20. The method for producing water-repellent articles as claimed in claim 19, wherein said solution further contains a solvent.

21. A solution for forming a water-repellent film consisting essentially of a silicon alkoxide or hydrolyzate thereof in the form of monomer or polymer of not higher than nonadecamer, a fluoroalkyl group-containing silane compound and an acid.

22. The solution for forming a water-repellent film as claimed in claim 21, wherein said solution further contains an additional acid and water content in a concentration satisfying the following relationships, respectively:

$$0.001 \leq S \leq 3; \text{ and}$$

$$0 \leq W \leq 20$$

wherein S represents the concentration of the total acid (normal); and W represents the concentration of water content (% by weight), and the proportion of said silicon alkoxide or hydrolyzate thereof in the form of a monomer or polymer of not higher than nonadecamer and said fluoroalkyl group-containing silane compound dissolved in said solution is 100:0.05 to 50 as calculated in terms of Si(Cl):Si(F) wherein Si(Cl) represents the number of silicon atoms in said silicon alkoxide or hydrolyzate thereof in the form of a monomer or polymer of not higher than nonadecamer and Si(F) represents the number of silicon atoms in said fluoroalkyl group-containing containing silane compound.

23. The solution for forming a water-repellent film as claimed in claim 22, wherein the concentration of said total acid and said water content satisfy the following relationships, respectively:

$$0.01 \leq S \leq 1; \text{ and}$$

$$0 \leq W \leq 10$$

and said proportion Si(Cl):Si(F) is 100:0.05 to 30.

24. The solution for forming a water-repellent film as claimed in claim 23, wherein the concentration of said total acid and said water content satisfy the following relationships, respectively:

$$0.1 \leq S \leq 1; \text{ and}$$

$$0 \leq W \leq 2$$

and said proportion Si(Cl):Si(F) is 100:0.05 to 3.

25. The solution for forming a water-repellent film as claimed in claim 21, wherein said solution comprises said silicon alkoxide or hydrolyzate thereof in the form of a monomer or polymer of not higher than nonadecamer and said fluoroalkyl group-containing silane compound dissolved therein in a total amount of from 0.01 to 10% by weight.

26. The solution for forming a water-repellent film as claimed in claim 21, wherein said fluoroalkyl group-containing compound is tetrachlorosilane.

27. The solution for forming a water-repellent film as claimed in claim 21, wherein said fluoroalkyl group-containing silane compound is a silane compound containing a fluoroalkyl group and an alkoxyl group, acyloxy group or chlorine atom.

28. The solution for forming a water-repellent film as claimed in claim 21, wherein said fluoroalkyl group-containing silane compound is 3-heptadecafluorodecyl trimethoxysilane or 3-heptadecafluorodecyltrichlorosilane.

29. The solution for forming a water-repellent film as claimed in claim 21, wherein said solution further contains a solvent.

30. The solution for forming a water-repellent film as claimed in claim 29, wherein said solvent is a hydrophilic solvent.

31. The solution for forming a water-repellent film as claimed in claim 30, wherein said solvent is an alcoholic solvent.

32. The solution for forming a water-repellent film as claimed in claim 21, wherein said solution further comprises an acid dissolved therein.

33. The solution for forming a water-repellent film as claimed in claim 32, wherein the concentration of said acid is not less than 0.3 times the water content of said solution.

34. The solution for forming a water-repellent film as claimed in claim 32, wherein said acid is hydrochloric acid.

35. The solution for forming a water-repellent film as claimed in claim 21, wherein said solution has a pH of from 0 to 3.

36. A solution for forming a water-repellent film obtained by dissolving a chlorosilyl group-containing compound and a fluoroalkyl group-containing silane compound in a solvent containing an alcohol and/or water content so that the chloro group in said chlorosilyl group-containing compound is substituted by alkoxyl group or hydroxyl group.

37. A water-repellent article comprising a substrate and a water-repellent film comprising silicon oxide as a main component and fluoroalkyl group applied to the surface of said substrate by sol-gel method, characterized in that the surface of said water-repellent film has an arithmetic mean roughness (Ra) of not more than 0.5 nm and a roughness (Rz) of not more than 5 nm on the average over 10 points.

38. A water-repellent article comprising a substrate and a water-repellent film comprising silicon oxide as a main component and fluoroalkyl group applied to the surface of said substrate by sol-gel method, characterized in that the fluorine concentration in the surface of said water-repellent film is not less than 0.8 as calculated in terms of ratio of fluorine atom to silicon atom.

39. The solution for forming a water-repellent film as claimed in claim 36, wherein said solution further contains an additional acid and water content in a concentration satisfying the following relationships, respectively:

$$0.001 \leq S \leq 3; \text{ and}$$

$$0 \leq W \leq 20$$

wherein S represents the concentration of the total acid (normal); and W represents the concentration of water content (% by weight), and the proportion of said chlorosilyl group-containing compound and said fluoroalkyl group-containing silane compound dissolved in said solution is 100:0.05 to 50 as calculated in terms of Si(Cl):Si(F) wherein Si(Cl) represents the number of silicon atoms in said chlorosilyl group-containing compound and Si(F) represents the number of silicon atoms in said fluoroalkyl group-containing silane compound.

40. The solution for forming a water-repellent film as claimed in claim 36, wherein the concentration of said total acid and said water content satisfy the following relationships, respectively:

$$0.01 \leq S \leq 1; \text{ and}$$

$$0 \leq W \leq 10$$

and said proportion Si(Cl):Si(F) is 100:0.05 to 30.

41. The solution for forming a water-repellent film as claimed in claim 36, wherein the concentration of said total acid and said water content satisfy the following relationships, respectively:

$$0.1 \leq S \leq 1; \text{ and}$$

$$0 < W \leq 2$$

and said proportion Si(Cl):Si(F) is 100:0.05 to 3.

42. The solution for forming a water-repellent film as claimed in claim 36, wherein said solution comprises said chlorosilyl group-containing compound and said fluoroalkyl group-containing silane compound dissolved therein in a total amount of from 0.01 to 10% by weight.

43. The solution for forming a water-repellent film as claimed in claim 36, wherein said fluoroalkyl group-containing compound is tetrachlorosilane.

44. The solution for forming a water-repellent film as claimed in claim 36, wherein said fluoroalkyl group-containing silane compound is a silane compound containing a fluoroalkyl group and an alkoxyl group, acyloxy group or chlorine atom.

45. The solution for forming a water-repellent film as claimed in claim 36, wherein said fluoroalkyl group-containing silane compound is 3-heptadecafluorodecyl trimethoxysilane or 3-heptadecafluorodecyltrichlorosilane.

46. The solution for forming a water-repellent film as claimed in claim 36, wherein said solution further contains a solvent.

47. The solution for forming a water-repellent film as claimed in claim 46, wherein said solvent is a hydrophilic solvent.

48. The solution for forming a water-repellent film as claimed in claim 47, wherein said solvent is an alcoholic solvent.

49. The solution for forming a water-repellent film as claimed in claim 36, wherein said solution further comprises an acid dissolved therein.

50. The solution for forming a water-repellent film as claimed in claim 49, wherein the concentration of said acid is not less than 0.3 times the water content of said solution.

51. The solution for forming a water-repellent film as claimed in claim 49, wherein said acid is hydrochloric acid.

52. The solution for forming a water-repellent film as claimed in claim 36, wherein said solution has a pH of from 0 to 3.

53. The method for producing water-repellent articles as claimed in claim 19, wherein said solution further contains an additional acid and water content in a concentration satisfying the following relationships, respectively:

$$0.001 \leq S \leq 3; \text{ and}$$

$$0 \leq W \leq 20$$

wherein S represents a concentration of the total acid (normal); and W represents a concentration of the water content (% by weight), and the proportion of said silicon alkoxide or hydrolyzate thereof in the form of a monomer or polymer of not higher than nonadecamer and said fluoroalkyl group-containing silane compound dissolved in said solution is 100:0.05 to 50 as calculated in terms of Si(Cl):Si(F) wherein Si(Cl) represents the number of silicon atoms in said silicon alkoxide or hydrolyzate thereof in the form of a monomer or polymer of not higher than nonadecamer and Si(F) represents the number of silicon atoms in said fluoroalkyl group-containing silane compound.

54. The method for producing water-repellent articles as claimed in claim 53, wherein the concentration of said total acid and said water content satisfy the following relationships, respectively:

$$0.01 \leq S \leq 1; \text{ and}$$

$$0 \leq W \leq 10$$

and said proportion Si(Cl):Si(F) is 100:0.05 to 30.

55. The method for producing water-repellent articles as claimed in claim 54, wherein the concentration of said total acid and said water content satisfy the following relationships, respectively:

$$0.1 \leq S \leq 1; \text{ and}$$

$$0 \leq W < 2$$

and said proportion Si(Cl):Si(F) is 100:0.05 to 3.

56. The method for producing water-repellent articles as claimed in claim 19, wherein said solution comprises said silicon alkoxide or hydrolyzate thereof in the form of a monomer or polymer of not higher than nonadecamer and said fluoroalkyl group-containing silane compound dissolved therein in a total amount of from 0.01 to 10% by weight.

57. The method for producing water-repellent articles as claimed in claim 1, wherein said fluoroalkyl group-containing silane compound is a silane compound containing a fluoroalkyl group and an alkoxyl group, acyloxy group or chlorine atom.

58. The method for producing water-repellent articles as claimed in claim 19, wherein said fluoroalkyl group-containing silane compound is 3-heptadecafluorodecyl trimethoxysilane or 3-heptadecafluorodecyltrichlorosilane.

59. The method for producing water-repellent articles as claimed in claim 19, wherein said solvent is a hydrophilic solvent.

60. The method for producing water-repellent articles as claimed in claim 59, wherein said solvent is an alcoholic solvent.

61. The method for producing water-repellent articles as claimed in claim 19, wherein said substrate is one containing a hydrophilic group in the surface thereof.

62. The method for producing water-repellent articles as claimed in claim 19, wherein said solution further comprises an acid dissolved therein.

63. The method for producing water-repellent articles as claimed in claim 62, wherein the concentration of said acid is not less than 0.3 times the water content of said solution.

64. The method for producing water-repellent articles as claimed in claim 62, wherein said acid is hydrochloric acid.

65. The method for producing water-repellent articles as claimed in claim 19, wherein said solution has a pH of from 0 to 3.

66. The method for producing water-repellent articles as claimed in claim 19, wherein said water-repellent film has a thickness of from 5 to 200 nm.

67. A water-repellent article obtained by a method as claimed in claim 19, characterized in that the surface of said water-repellent film has an arithmetic mean roughness (Ra) of not more than 0.5 nm and a roughness (Rz) of not more than 5 nm on the average over 10 points.

68. A water-repellent article obtained by a method claimed in claim 19, characterized in that the fluorine concentration in the surface of said water-repellent film is not less than 0.8 as calculated in terms of a ratio of fluorine atom to silicon atom.

* * * * *